G. W. UPTON & B. F. FLEGEL.
LEVEL WINDING FISHING REEL.
APPLICATION FILED JUNE 1, 1917.
1,282,990.
Patented Oct. 29, 1918.
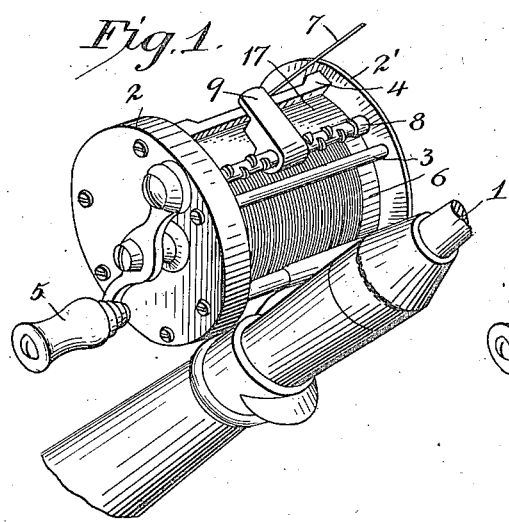
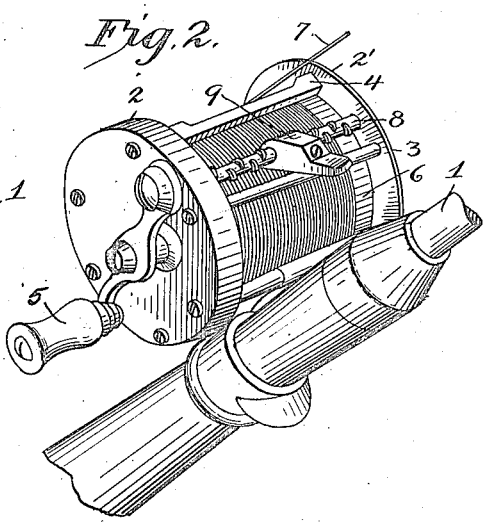
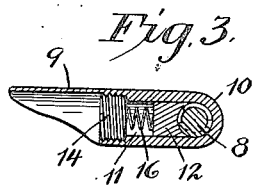
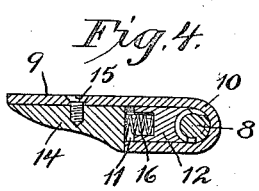
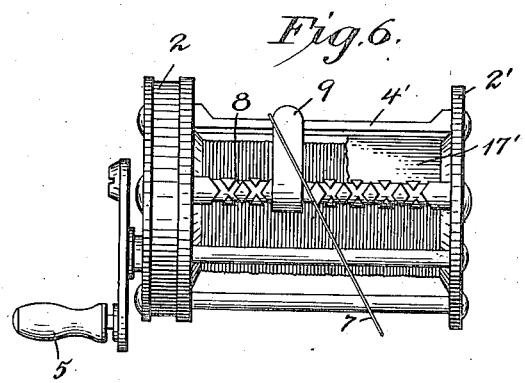
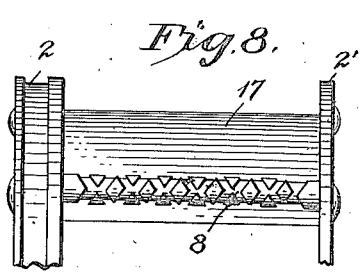
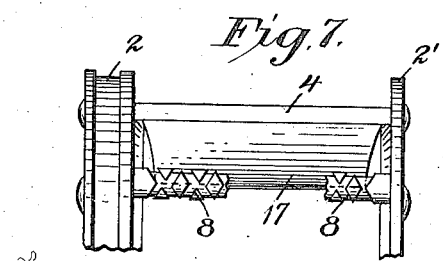
Inventors.
Benjamin F. Flegel
George W. Upton

UNITED STATES PATENT OFFICE.

GEORGE W. UPTON, OF WARREN, OHIO, AND BENJAMIN F. FLEGEL, OF RACINE, WISCONSIN; SAID FLEGEL ASSIGNOR TO SAID UPTON.

LEVEL-WINDING FISHING-REEL.

1,282,990. Specification of Letters Patent. Patented Oct. 29, 1918.

Continuation of application Serial No. 837,097, filed May 7, 1914. This application filed June 1, 1917. Serial No. 172,327.

*To all whom it may concern:*

Be it known that we, GEORGE W. UPTON and BENJAMIN F. FLEGEL, citizens of the United States of America, respectively residing at Warren, in the county of Trumbull, Ohio, and Racine, in the county of Racine and State of Wisconsin, have invented certain new and useful Improvements in Level-Winding Fishing-Reels, of which the following is a specification.

This invention relates to improvements in line carriers for the uniform mechanical distribution of fishing lines on the spools of fishing reels (known as level winders) and is a continuation of the application of George W. Upton; Serial No. 837,097, filed May 7, 1914, which has matured into Patent No. 1,212,288, and to which specific reference is hereby made as well as waiver of all matters and elements therein specifically claimed.

Briefly stated this invention covers improved and simplified modifications of the line carrier element of that invention and protection of the line as against accidental cutting thereof; the objects being first, to produce a carrier as simple and small as possible; second, to so construct it that it will fall out of the way when a cast is made and automatically resume a normal operating position when the spool is revolved to wind in the fishing line; third, to reduce the number of required operative elements, and fourth to provide against possibility of cutting loose coils of the line on a threaded element as fully described hereinafter and set forth in the claims.

In the accompanying drawings Figure 1 is a view in perspective of a fishing reel on the reel seat of a rod equipped with our present invention in operative position for winding a line in.

Fig. 2 is a like view showing our invention when a cast has been made and with the protecting apron removed.

Figs. 3, 4 and 5 show our improved carrier in enlarged sectional views, in modifications; and Fig. 6 shows an enlarged elevation of the same with other elements broken away.

Figs. 7 and 8 illustrate samples of aprons or plates protecting the coiled line.

Similar characters refer to like parts throughout the several views, in which 1 designates a fishing rod (broken away); 2 and 2' the head and tail plates of a fishing reel; 3 a pillar and 4 a special pillar with raised ends; 5 the crank; 6 the spool with a line 7 on it, shown broken away but leading when extended fully to the first guide on the rod 1.

A reverse threaded shaft, parallel to the axle of the spool and rotated by the gears (or otherwise) is designated 8 and the carrier by 9.

The carrier 9 comprises a block of metal or body 10 (Figs. 3, 4 and 5) sleeved upon the shaft 8 and having a bore 11 lengthwise of it and perpendicular to the bore through which the shaft 8 passes, for the reception of a pawl 12, whose lower end is beveled and cut in crescent form to ride in the channel of the reverse thread in the usual way.

A plug 14 is located in the bore 11 after the pawl 12 has been inserted and may be threaded into place in the form of an ordinary screw, as shown in Figs. 2, 3 and 5, or it may be a block or plug as shown in the modification in Fig. 4 and held in place by a small screw 15. This modification presents a neater and more finished appearance.

A final element of the carrier 9 is a spring (of any kind) illustrated as being a small spiral, coiled spring, 16, which rests between the plug 14 and the pawl 12, within the bore 11, and which may contact at its extremities with their flat ends as in Fig. 3, or may lie in a pocket in the pawl 12, as in Fig. 4 or in a pocket in the plug 14, as in Fig. 5.

An exceedingly light spring is preferable so that the carrier 9 easily falls forward (as in Fig. 2) when a cast is made; and a very slight friction is produced between the pawl 12 and the shaft 8, sufficient to flop the carrier up to operative position against the special pillar 4 when the shaft is rotated toward spool 6 as shown in Fig. 1.

Said line supporting special pillar with raised ends is fully claimed in said application No. 837,097 and we do not claim it in this application.

We have however so improved such carriers by this invention that they can be used effectively without the said terminal elevations and without any opening or slot between two prongs at the upper end of said carrier, or without any other line retaining terminal: thus—

We extend lateral edges of the carrier 9 straight up far enough so that their flat faces extend as much as the diameter of a fishing line 7, (Fig. 6) above any pillar, bar or plate as 4' or 17', which extends from the head plate 2 to the tail plate 2', and claimed in said prior application, and then extend the whole end of the carrier 9 a little farther and rounded, as in Fig. 6.

Consequently, when winding the line in, no matter on what part of the pillar it has fallen, as soon as either edge of the carrier strikes it, it is pushed over to the adjacent side of the reel and, because of its angling direction from that point to the first guide of the rod, it jumps over the carrier, which then pushes it to the opposite side, and so on; acting exactly as one's thumb does when the caster thumbs the line to and fro on the reel except that his thumb points down and this mechanical thumb points up.

To avoid any possibility of the edges of the reverse thread on the shaft 8 cutting the line in case it inadvertently loosens enough on the spool to have any of its winds thrown against the shaft, we provide an apron 17, shown in Figs. 7 and 8, which may be attached to or made part of pillar 4, or may consist of a plate extending from head plate to tail plate as is most economical.

It will be apparent to those skilled in the art that corresponding results can be arrived at by the use of any spring retained pawl, whether a narrow carrier alone is operated or whether other elements extending across the face of the reel in front of the spool and coöperating for the purpose with a carrier are employed; and we claim broadly the invention as to the frictionally operated pawl with a reverse thread no matter what mechanical equivalent, substitute or subterfuge is used with it, as hereinafter distinctly set forth in the following claims:

1. The combination of a complete fishing reel; with means for coiling a fishing line on the axle of its spool, comprising a reversely threaded shaft parallel with said axle, and rotatably journaled in the end-plates of said reel, a rocking element sleeved on said shaft and reciprocating between said end-plates, a pawl within said rocking element, and means for retaining said pawl within said element and in contact with said shaft.

2. On a level winding fishing reel having a reverse threaded shaft in front of its spool, a laterally reciprocating line distributer, rockably sleeved upon said shaft; in combination with a pawl, a binding spring and a retaining plug, for the purpose set forth.

3. A level winding fishing reel having a rotatable reversely threaded shaft between its end-plates; in combination with a line distributer having rounded corners at its top, and operating laterally on said shaft when it is rotated, and a line support extending from end-plate to end-plate of said reel, and provided with line shunting and lifting elements at its extremities adjacent to said end-plates.

In testimony whereof we affix our signatures in presence of two witnesses.

GEORGE W. UPTON.
BENJAMIN F. FLEGEL.

Witnesses to Upton:
  M. L. RICE,
  P. BETHUNE.
Witnesses to Flegel:
  V. BRAMOW,
  FRANK BASINGER.